United States Patent [19]

Astle

[11] Patent Number: 5,754,742
[45] Date of Patent: May 19, 1998

[54] SETTING QUANTIZATION LEVEL TO MATCH DCT COEFFICIENTS

[75] Inventor: Brian Astle, Plainsboro, N.J.

[73] Assignee: Intel Corporation, Santa Clara, Calif.

[21] Appl. No.: 440,535

[22] Filed: May 12, 1995

[51] Int. Cl.[6] ............................................. G06F 17/00
[52] U.S. Cl. .............................. 395/2.39; 395/523
[58] Field of Search ........................ 395/800, 2.39, 395/523

[56] References Cited

U.S. PATENT DOCUMENTS

| | | | |
|---|---|---|---|
| 5,533,138 | 7/1996 | Kim | 382/232 |
| 5,535,019 | 7/1996 | Eschbach | 358/456 |
| 5,539,662 | 7/1996 | Nickerson | 364/514 R |
| 5,561,464 | 10/1996 | Park | 348/397 |
| 5,561,719 | 10/1996 | Sugahara | 382/50 |

*Primary Examiner*—Eric Coleman
*Attorney, Agent, or Firm*—William H. Murray; N. Stephan Kinsella

[57] ABSTRACT

A computer-implemented method and apparatus for processing signals. According to a preferred embodiment, a rate controller determines an initial quantization level for quantizing a block of coefficient signals representative of an image, wherein coefficient signals quantized with a given quantization level are associated with a quantization error. At least one new quantization level is generated in accordance with the initial quantization level. The quantization error associated with the initial quantization level and the at least one new quantization level is determined. A quantization level is selected from the initial quantization level and the at least one new quantization level in accordance with this determination.

30 Claims, 4 Drawing Sheets

FIGURE 1. ENCODING SYSTEM

FIGURE 2. DECODING SYSTEM

SETTING QUANTIZATION LEVEL TO MATCH DCT COEFFICIENTS

BACKGROUND OF THE INVENTION

1. Field of the Invention

The present invention relates to signal processing and, in particular, to computer-implemented processes and apparatuses for setting the quantization level used in encoding signals.

2. Description of the Related Art

This invention relates to signal processing which is often used to compress video image signals representative of video pictures into an encoded bitstream. Each picture may be a still image, or may be part of a plurality of successive pictures of video signal data that represent a motion video. As used herein, "picture" and "video picture" may interchangeably refer to signals representative of an image as hereinabove described.

The portion of an encoded bitstream representing a compressed picture may be stored in a mass storage device such as a hard disk drive or compact disk read-only-memory (CD-ROM) in its compressed format in order to conserve storage space. When the compressed picture is later retrieved it may be decompressed and, for example, displayed on a monitor. A higher amount of compression of the blocks constituting an image tends to lower the number of bits needed to represent the image, but also tends to diminish the quality of the image reconstructed by the decoder.

The encoded bitstream may also be transmitted to one or more remote signal processing systems such as video conferencing nodes which decode the encoded signals. These video conferencing nodes may be personal computer (PC)-based systems communicating with each other over a selected transmission medium. Possible transmission media include Integrated Services Digital Network (ISDN) and Public Switched Telephone Network (PSTN) telephone connections. Although ISDN connections provide a higher bandwidth than PSTN connections, ISDN connections are currently less readily available and more expensive than PSTN connections.

Because transmission media have finite bandwidths, in order to provide video conferencing of satisfactory quality each PC system preferably compresses or encodes in real time the video signals corresponding to the local participant and transmits the resulting compressed signals or bitstreams to the PC systems of the remote participants. In such a video conferencing system, each PC system also preferably receives and decompresses compressed signals from the PC systems of the remote participants to play the decompressed video signals locally. The encoder may also, in some usages, encode video pictures offline to perform more computation intensive and more efficient encoding.

Such encoding operations that compress video image signals typically operate on subsets of the image, such as (8×8) blocks of pixels, or on macroblocks comprising a number of such blocks. A macroblock comprises a (16×16) array of luminance pixels (also known as "luma pels") and two associated (8×8) blocks of chroma information. The (16×16) luma array is further divided into four (8×8) blocks, and all six blocks in a macroblock are typically transformed using the forward discrete cosine transform (DCT), quantized, and further encoded.

Thus, the (8×8) blocks of the image to be encoded are typically transformed by a forward DCT to generate a transformed signal comprising 64 DCT coefficients, which are also arranged in an (8×8) block. One technique for controlling the bit rate of the encoded bitstream is to select varying quantization levels at the encoding stage which are applied to the DCT coefficients to produce coefficient indexes. Varying quantization levels may be produced by using a basic quantization table which is multiplied by the quantization level (also referred to as the quantizer step size or quantization scale). Thus, when a basic quantization table is utilized in this manner, the quantization scale corresponds to the quantization level. For example, a quantization scale of 7 corresponds to a quantization level of 7, where 7 is multiplied by each entry in the basic quantization table to produce a scaled quantization table that corresponds to quantization level 7. A particular quantization level is typically selected within an acceptable range of quantization levels which are expected to produce approximately the desired codesize.

In quantization, each DCT coefficient is divided by the quantization factor in the corresponding (8×8) block position in order to reduce the number of bits needed to represent the coefficient. As is appreciated by those skilled in the art, use of a coarser quantization table, associated with a coarser quantization level, implies using fewer bits to encode an image but at the cost of image quality. Use of finer quantization tables results in encoded bitstreams with more bits but with higher quality images upon decompression or decoding. This type of bit rate control is often referred to as primary bit rate control. Secondary bit rate control involves the dropping of pictures or images from the video stream. The secondary bit rate control is a back-up mode in case the primary bit rate control is insufficient.

Existing techniques for encoding video signals include standards developed by the Moving Pictures Experts Group (MPEG) of the International Standards Organization (ISO), such as the MPEG-1 and MPEG-2 standards. Other standards include the H.261 standard developed by the International Telegraph Union (ITU).

In existing techniques for encoding video signals, a reconstructed picture decoded from the encoded bitstream can suffer quality degradation due to, inter alia, inaccuracies in the quantization and dequantization process. In particular, often a quantization level is selected from a range of acceptable quantization levels that yields more encoding errors in encoding the block than if another quantization level within the acceptable range had been selected.

There is thus a need for computer-implemented processes and apparatuses for more efficiently setting the quantization level.

SUMMARY

There is provided herein a computer-implemented method and apparatus for processing signals. According to a preferred embodiment of the invention, a rate controller determines an initial quantization level for quantizing a block of coefficient signals representative of an image, wherein coefficient signals quantized with a given quantization level are associated with a quantization error. At least one new quantization level is generated in accordance with the initial quantization level. The quantization error associated with the initial quantization level and the at least one new quantization level is determined. A quantization level is selected from the initial quantization level and the at least one new quantization level in accordance with this determination.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

In the present invention, there is disclosed a computer-implemented method and apparatus for setting the quantization level used in encoding a block of pixels. The quantization level used is adjusted based on the actual values of DCT coefficients to be quantized in a given macroblock or block, so that quantization error is reduced. Methods and apparatuses for performing these functions are described in further detail hereinbelow.

Video Processing System Hardware

Figure 1:
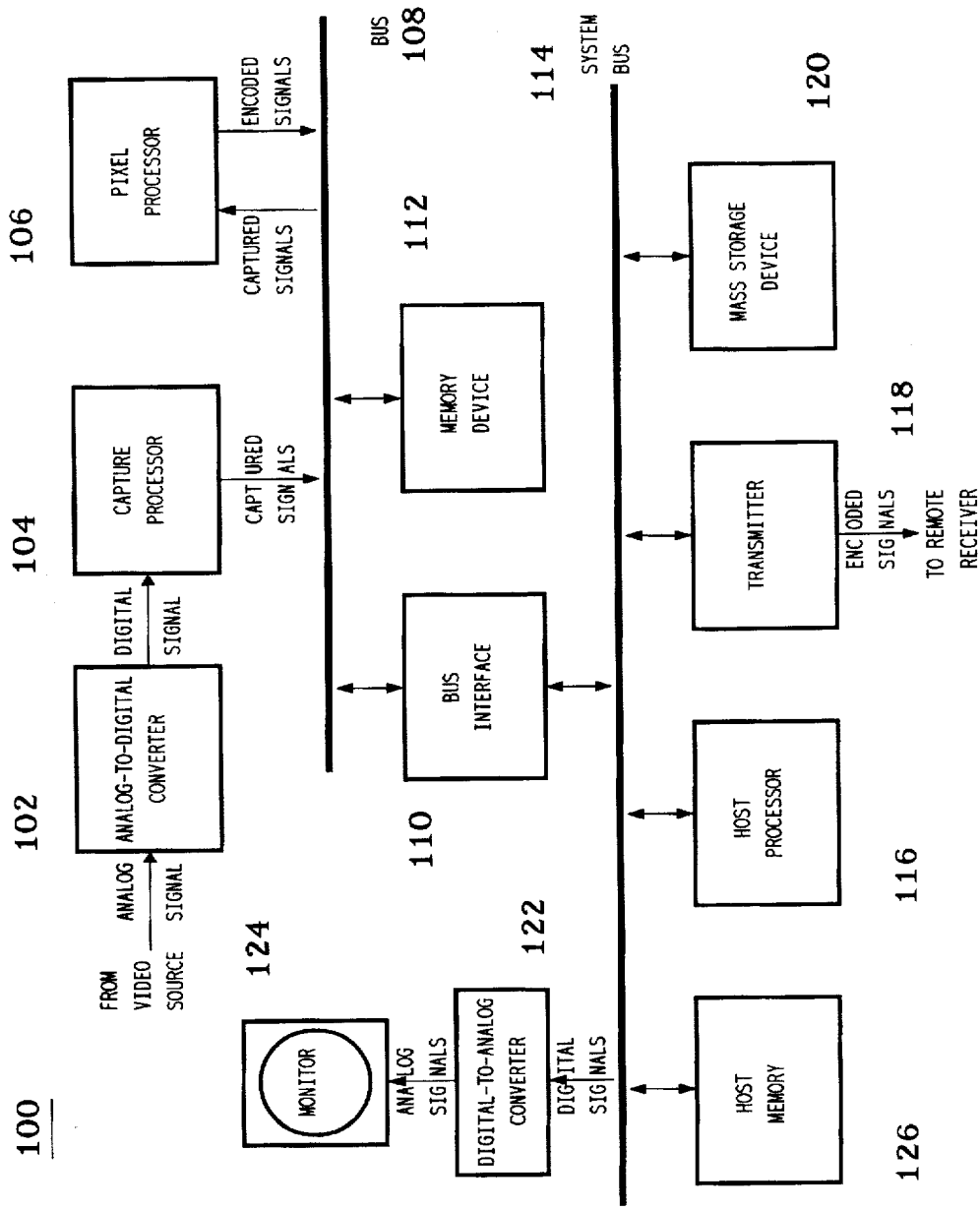
FIG. 1 is a computer-based video processing system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each picture of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, as described in more detail below, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
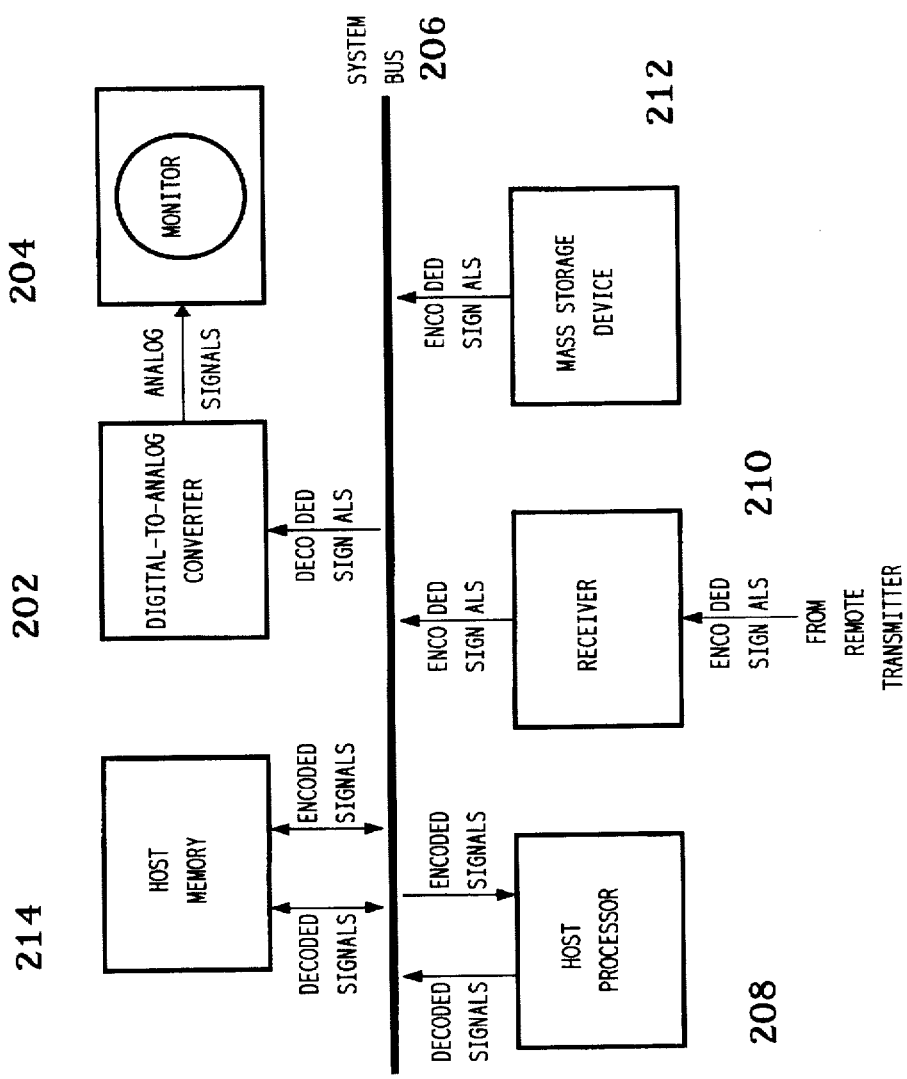
FIG. 2 is a computer-based decoding system for decoding the video signals encoded by the video processing system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled pictures. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386, 486, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC) -based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded video image signals in real-time during the capture and encoding of video signals to monitor the encoding processing. In a preferred embodiment, encoding system 100 encodes video image signals in real time to yield an encoded bitstream, and transmits the encoded bitstream to decoding system 200. Encoding system 100 sets the quantization level for particular blocks to be encoded as described in further detail hereinbelow.

Encoder Rate Control

Figure 3:
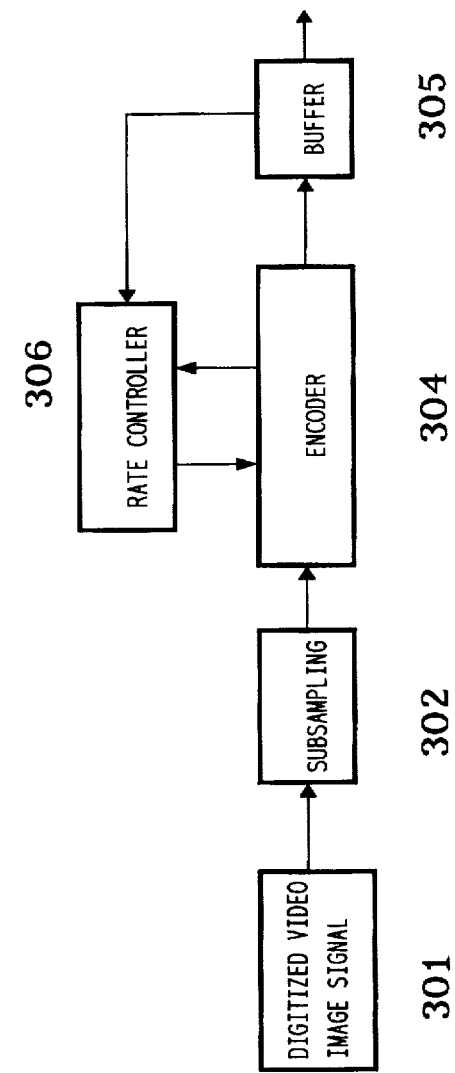
FIG. 3 is a process flow diagram of the encoding processing implemented by the video processing system of FIG. 1, in accordance with the present invention.

Referring now to FIG. 3, there is shown a process flow diagram of the encoding processing implemented by capture processor 104 and pixel processor 106 of FIG. 1, according to a preferred embodiment of the present invention. As shown in FIG. 3, capture processor 104 of FIG. 1 captures and digitizes video image signals to provide a digitized video image signal 301. As described above, video image signal 301 is a single picture of video data, which may be a still image or one of a plurality of pictures that constitute motion video. Capture processor 104 further performs the subsampling 302 of digitized image 301 to provide a subsampled, digitized video image comprising an array of pixels. At this point the pixel array is broken up into subimages or blocks of (8×8) pixels which are independently encoded further.

Encoder 304, also under control of rate controller 306, applies a transform such as a DCT to the subimage blocks and quantizes the DCT coefficients at a determined quantization level, as described in further detail below. Buffer 305 next receives the encoded bitstream representing the quantized DCT coefficients for transmission via the transmission medium to a destination source. It will be understood by those skilled in the art that, in a preferred embodiment, the functional elements of the process flow diagram of FIG. 3 are implemented by capture processor 104 and pixel processor 106 of FIG. 1. Those skilled in the art will further appreciate that additional processing may be applied to video image signal 301 at or after the encoder 304 stage, such as motion estimation, inter- or intra-picture encoding, and run-length encoding.

Rate controller 306 adjusts the bit rate by varying the quantization levels to be applied to the DCT coefficients of the transformed video image in the following-described manner. If a first encoded picture yields an encoded bitstream having more bits than the target bitstream size for that picture, a coarser (i.e., generally higher) quantization level may be applied to the next picture in order to reduce the bit rate so that the average bit rate approaches the target bitstream rate. Thus, as will be understood by those skilled in the art, a finer or coarser quantization level may be used to increase or decrease the target bitstream rate.

A given quantization level Q corresponds to one of several quantization tables having generally coarser or finer quantization factors. A particular quantization table is achieved, in a preferred embodiment, by scaling a basic quantization table by a quantization scale equal to the quantization level Q, where Q may range from 1 to 31. Thus, each entry in the basic table is multiplied by the quantization scale Q to form a quantization table corresponding to the desired quantization level. The new quantization table thus formed is used to quantize the DCT coefficients produced from DCT transforms applied to a given video image. The MPEG-1 encoding standard utilizes the quantization matrix as shown in Table 1, below, which may be used as the basic quantization table for the present invention:

TABLE 1

| MPEG-1 Quantization Table | | | | | | | |
|---|---|---|---|---|---|---|---|
| 8  | 16 | 19 | 22 | 26 | 27 | 29 | 34 |
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

In quantization, each DCT coefficient of the coefficients of a transformed (8×8) block is divided by the quantization factor in the corresponding (8×8) block position of the applicable quantization table, and then either rounded to the nearest number or the fractional part is truncated. When DCT coefficients are scaled down in this manner by dividing by a quantization divisor, many of them become zeros, making them easier to represent with fewer bits, for example by run-length encoding applied to the bitstream after the encoder stage 304.

One goal of such a bit rate control may be to minimize the total mean square error over the entire picture. Such a strategy may be appropriate for encoding video sequences comprising scene changes and where motion may occur in any region of the picture. In video conferencing usage, however, scene changes may be rare or even nonexistent and motion tends to be concentrated in particular regions of the images (e.g., the center of the picture containing conference participants), while other regions containing background scenes may change infrequently, if at all. Moreover, the human eye is more sensitive to coding errors in different types of video scenes. For example, the human eye is more sensitive to coding errors in smooth or uniform regions (e.g., plain walls) than in regions of high random detail (e.g., foliage). Similarly, the human eye is more sensitive to coding errors in regions of stationary uniform detail (e.g., striped wallpaper) than in regions of motion (e.g., person moving across a room). As such, overall video quality is improved by using finer quantization to encode those regions to which the human eye is more coding-error sensitive (thereby preserving more detail) than is used for those regions to which the human eye is less coding-error sensitive. In this manner, scarce transmission or storage bandwidth is shifted from less crucial to more crucial needs so that overall quality is improved.

As will be understood by those skilled in the art, some coding standards (such as MPEG-1) allow the quantization level to be varied throughout the picture in order to match the local visual complexity and achieve the best perceived quality of the coded picture. Within a picture the quantization level should be set higher in areas where there is more high-frequency energy, i.e. in areas of greater visual complexity, partly because quantization artifacts are less visible in such areas. Thus, in general the quantization level should be lower in "flat" or smooth areas (i.e. areas with low complexity or spatial energy), such as the sky, to reduce a quantization artifact known as "blockiness." Saving bits in complex or "busy" areas of a picture allows the encoder to reduce the quantization level in smooth areas of the picture and hence to reduce, or eliminate, artifacts such as blockiness.

Thus, each block may be quantized using different a quantization level. Typically, however, each (8×8) block within a macroblock is quantized at the same quantization level. Thus, quantization levels are usually chosen on a macroblock level, and this quantization level is applied to each block within the macroblock.

The selection of which quantization level will be used is part of the bit rate control in the compression processing of the present invention. Rate controller 306 thus selects the quantization level at which to encode blocks within a macroblock based on some or all of the following factors: a characterization of the complexity of the picture (e.g., based on the sum of the absolute values of the DCT coefficients), the error variance, the actual fullness of rate control buffer 305 and the desired nominal fullness, image or block size, the current position within the picture, the results of prescan, the channel bit rate, picture rate, the experience of coding similar pictures earlier in the sequence, and the buffering capability of a decoding system such as decoding system 200.

In a preferred embodiment, therefore, as described above, the video image signals, which comprise pictures in a video conferencing environment, are divided into regions of (8×8) blocks, where each region may be encoded using a different quantization level. Rate controller 306 keeps track of the total number of bits used to encode each region of a picture, and of the total number of bits used to encode each picture.

The initial quantization level Q for the current region of the current picture may in some uses be selected using Equation (1) as follows:

$$Q = Q_{ave} * \frac{(C_{ave} + R*C)}{(R*C_{ave} + C)},  \quad (1)$$

where C is the complexity of the current region, $C_{ave}$ is the average complexity for the current picture, $Q_{ave}$ is the average quantization level for the current picture, and R is a specified constant (preferably with a value of approximately 2). Such a formula allows the quantization levels to vary from block to block over each picture, where the constant R determines the magnitude of the allowable variation.

As will be understood, when a DCT is performed on an (8×8) block of an image, the 64 coefficients are arranged in zig-zag fashion from the upper left corner of an (8×8) block down to the lower right corner. When arranged this way, the upper left corner of a block of DCT coefficients contain the DC component and lower frequency coefficients of the transformed block, while the lower right corner contains the higher frequency components of the transformed block. Larger quantization factors are grouped in the lower right regions of the each quantization table, as can be seen in the Table 1, above, while smaller divisors are grouped in the upper left region of a table. In this manner higher frequency coefficients tend to be divided by higher divisors than the DC component and lower frequency components. The reason for this weighting is that loss of information in the higher frequency ranges is less visible to human visual perception than is loss of information in the lower frequency ranges.

Quantization and Indexes

From an encoding point of view, the initial quantization level chosen by rate controller 306 in accordance with the above-described techniques is not always optimal. Thus, in the present invention, the initial quantization level that results from above-described techniques is adjusted to select a new quantization level. The adjustment is based on the values of DCT coefficients of the block to be encoded, or on values of the DCT coefficients of all the blocks of the current macroblock. The new quantization level is selected in an attempt to produce a more accurate coding, or one which requires fewer coding bits, or both.

For illustrative purposes, a case will be considered in which a single quantization factor is selected to apply to each DCT coefficient within the entire block. Thus, in this example the entries of a possible quantization table are uniform throughout the table, rather than weighted as in Table 1. When a macroblock comprising a plurality of blocks (typically 6 blocks) is transmitted by an encoded bitstream, the quantized DCT coefficients are transmitted within the bitstream. The quantization level corresponding to blocks within the current macroblock is transmitted within the macroblock bitstream, where the quantization level or scale can range from 1 to 31, as discussed above. Also transmitted is an index for each DCT coefficient equal to the DCT coefficient divided by the corresponding quantization factor of the applicable quantization table, in this case equal to the quantization scale.

For example, if a particular DCT coefficient within a block is 100, this coefficient may be quantized in various ways. The quantization scale may be set, for example, to 25. Thus, the relevant quantization factor for the uniform quantization table is 25, resulting in a coefficient index of 4 which can be transmitted in place of the coefficient of 100. Then, upon reconstruction, each DCT coefficient index received is multiplied by the quantization factor for that particular coefficient, which in this case will be the uniform quantization level. As will be understood, other DCT coefficients in the same block produce different indexes equal to the respective DCT coefficient divided by the quantization factor.

As another example, a quantization level of 10 is selected for a given block, and one of the DCT coefficients to be quantized is 27. The index for this coefficient will thus be 27/10=2.7, which will be rounded to the nearest whole number, 3. When decoding system 200 decodes the quantized DCT indexes, the coefficient index 3 will be multiplied by the quantization factor, 10, to yield a DCT coefficient of 30, which is an inexact approximation of the original DCT coefficient, 27. Such inaccuracies may be referred to herein as quantization errors. If, however, the original quantization scale selected for the block is 9 rather than 10, the original DCT coefficient value of 27 is reproduced exactly in decoding system 200.

As a more detailed example, the DCT coefficients produced by rate controller 306 have the values as shown in Table 2 below:

TABLE 2

| Unquantized DCT Coefficients | | | | | | | |
|---|---|---|---|---|---|---|---|
| 0 | 1 | 2 | 27 | 0 | 1 | 2 | 0 |
| 1 | 0 | 10 | 8 | 0 | 0 | 0 | 0 |
| 0 | 1 | 0 | 0 | 1 | 0 | 0 | 0 |
| 18 | 0 | 2 | 0 | 0 | 0 | 0 | 0 |
| 1 | 0 | 0 | 0 | 0 | 0 | 0 | 0 |
| 0 | 2 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

For intra-encoded blocks (i.e., blocks that are not encoded with motion estimation techniques), the quantized coefficient recreated by decoding system 200 is given by:

quant_coeff=(index*quantization_scale*matrix)/8   (Eq. 1)

where the index is the value present in the coded bit stream, and matrix is the appropriate element of the single quantization matrix used with a quantization scale, as explained above with reference to Table 1.

For simplicity, and to illustrate the present invention more clearly, we assume that the value of every matrix element is 8, so that there is a uniform quantization level for the entire (8×8) block. Then Eq. 1 reduces to:

quant_coeff=index*quantization_scale where the quantization scale is equal to the quantization level.

If, after reconstruction according to this formula, the quantized coefficient is greater than zero and even, then it is made odd by subtracting 1. If it is less than zero and even, then it is made odd by adding 1. As will be understood by those skilled in the art, this technique, called "oddification," prevents long term build up of errors due to differences in implementation of the DCT.

In this example, the quantization scale is assumed to be set to 6. Thus, the indexes and reconstructed coefficients (after oddification) have the values as shown in Tables 3(a) and (b), below:

TABLE 3

| Values for Uniform Quantization Level = 6 | | | | | | | | |
|---|---|---|---|---|---|---|---|---|
| 0 | 0 | 0 | 5 | 0 | 0 | 0 | 0 | (a) Indexes Transmitted |
| 0 | 0 | 2 | 1 | 0 | 0 | 0 | 0 | |
| 0 | 0 | 0 | 0 | 0 | 0 | 0 | 0 | |
| 3 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 29 | 0 | 0 | 0 | 0 | (b) Reconstructed Coefficients |
| 0 | 0 | 11 | 5 | 0 | 0 | 0 | 0 | |
| 0 | 0 | 0 | 0 | 0 | 0 | 0 | 0 | |
| 17 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |

In this case, the total absolute error between the reconstructed coefficients in Table 3(b) and the original, unquantized DCT coefficients in Table 2 is 21. Those skilled in the art will understand that error is often determined utilizing a calculation known as the L1 Norm, which has the following form:

$$L1\ Norm = \sum_{i=0}^{i=n} \sum_{j=0}^{j=m} |a_{ij} - b_{ij}|$$

where:

$a_{ij}$ is the value in the ith row and jth column of the first matrix;

$b_{ij}$ is the value in the ith row and jth column of the second matrix;

n is the number of rows in a matrix; and m is the number of columns in a matrix.

The L2 Norm, which may also be used to calculate error, has the following form:

$$L2\ Norm = \sum_{i=0}^{i=n} \sum_{j=0}^{j=m} (a_{ij} - b_{ij})^2$$

If the quantization scale is set to 9 instead of 6, the indexes and reconstructed coefficients (after oddification) have the values as shown in Tables 4(a) and (b), below:

TABLE 4

| Values for Quantization Level = 9 | | | | | | | | |
|---|---|---|---|---|---|---|---|---|
| 0 | 0 | 0 | 3 | 0 | 0 | 0 | 0 | (a) Indexes Transmitted |
| 0 | 0 | 1 | 1 | 0 | 0 | 0 | 0 | |
| 0 | 0 | 0 | 0 | 0 | 0 | 0 | 0 | |
| 2 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 27 | 0 | 0 | 0 | 0 | (b) Reconstructed |

TABLE 4-continued

| Values for Quantization Level = 9 | | | | | | | | |
|---|---|---|---|---|---|---|---|---|
| 0 | 0 | 9 | 9 | 0 | 0 | 0 | 0 | Coefficients |
| 0 | 0 | 0 | 0 | 0 | 0 | 0 | 0 | |
| 17 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |
| 0 | 0 | 0 | 0 | 0 | 0 | 0 | 0 | |

The total absolute error between the reconstructed coefficients in Table 4(b) and the original, unquantized DCT coefficients in Table 2 is reduced to 17, when a quantization level of 9 is used, in contrast to an error of 21 when a quantization level of 6 is used. Thus, an advantage of the present invention is the reduction of quantization error. A further advantage of the present invention, as illustrated in the present example, is that the size of the coefficients is reduced as well, even though a coarser quantization scale is used. Thus, the encoding requires fewer bits even though quantization error is also reduced.

Therefore, in the present invention the quantization level is adjusted based on the values of the actual DCT coefficients to decrease the overall quantization-caused error. As explained above, however, in some coding schemes such as MPEG six blocks are encoded with the same quantization level: the four luma blocks, and two chroma blocks, which together constitute a macroblock. Thus, as will be understood, the effect of choosing a different quantization scale must be considered with respect to all six blocks within a macroblock.

Figure 4:
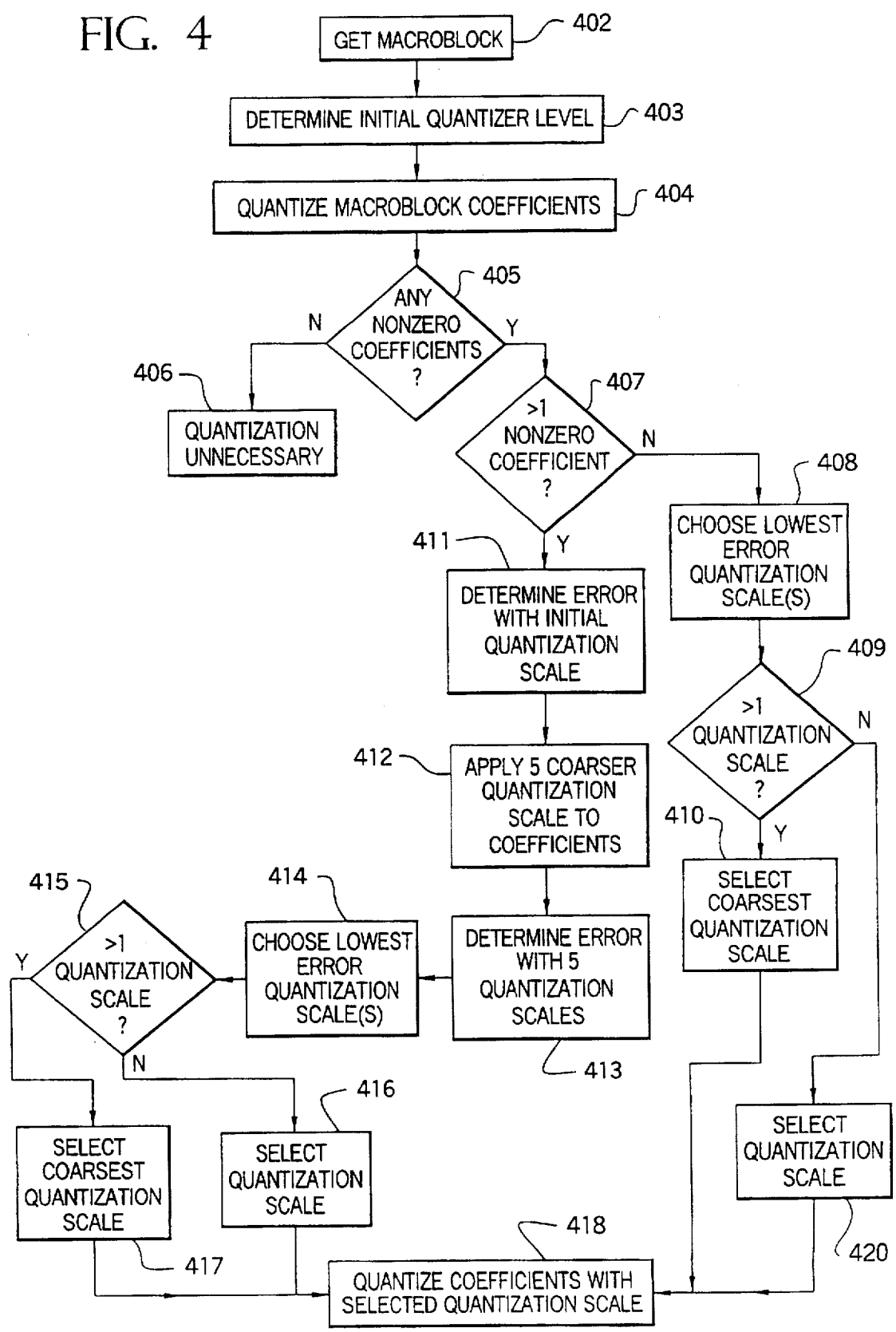
FIG. 4 is a flow chart of the method of operation of the video system of FIG. 1 in accordance with the present invention.

The method of operation of the present invention, as implemented on video system 100, will now be described with reference to the flow chart of FIG. 4. As illustrated in step 402 of FIG. 4, encoder 304 of FIG. 3 (implemented by pixel processor 106 of FIG. 1) gets a next macroblock to encode (step 402). As explained above, the macroblock comprises six (8×8) blocks which are encoded with the same quantization level. Rate controller 306 determines a quantization scale in accordance with the above-described procedure (step 403). As will be understood, the quantization scale selected equals the quantization level, and is multiplied by the basic quantization table to yield a scaled quantization table used to quantize the DCT coefficients of the current macroblock. The first quantization scale selected according to standard techniques will be referred to herein as the initial quantization scale.

Encoder 304 then performs quantization upon all DCT coefficients for all six blocks of the current macroblock (step 404). If all quantized DCT coefficients are zero, then quantization is not necessary (steps 405 and 406). If there is only one non-zero quantized coefficient, then the quantization scale selected is one for which the single non-zero DCT coefficient can be most accurately reconstructed (steps 407 and 408). If more than one quantization scale yield equally good results (step 409), then the coarsest (i.e. highest) of these quantization scales is selected to reduce the number of bits necessary to represent the index for this coefficient (step 410). Otherwise, if only one quantization scale yields the best results (steps 408 and 409), then it is selected (step 420). As will be appreciated by those skilled in the art, in alternative preferred embodiments, the quantization scale closest to the initial quantization scale may be selected when more than one quantization scale yield equally good results.

If there are more than two non-zero quantized DCT coefficients (step 407), then the initial quantization scale is adjusted, if necessary, to provide a new quantization scale so as to minimize the above-described quantization error. Therefore, the error associated with using the initial quantization scale is determined as described above (step 411). This may be based on the mean absolute error of the coefficients (e.g. the L1 Norm described above), or on the mean square error (e.g. the L2 Norm described above), or on some other measure.

Thereafter, various quantization scales coarser than the initial quantization scale and within a predetermined range of the initial quantization scale are used to form quantization tables which are applied to the DCT coefficients, with the associated error determined for each such adjusted quantization scale. In a preferred embodiment, every quantization scale coarser than the initial scale, up to five scales coarser, are applied to the DCT coefficients of the macroblock (step 412). Thus, if Q=3 is the initial quantization scale, then Q=8, 7, 6, 5, and 4 are also used to form quantization tables which are applied to the coefficients to determine the error resulting.

After selecting the plurality of candidate scales in step 412, the quantization error associated with each quantization scale is determined (step 413). Thereafter, of the plurality of scales, including the initial quantization scale, the scale(s) with the lowest error of the plurality are selected (step 414). If a single scale yields the lowest error, it is selected (steps 415 and 416). Where two or more quantization scales yield the same error, or yield the lowest errors that are within a predetermined threshold difference of one another, then the coarser (i.e. larger) quantization scale is selected, since it normally produces fewer encoded bits (step 417).

Once the applicable quantization scale has been selected in accordance with the present invention, the DCT coefficients of the current block may be quantized accordingly (step 418).

As will be appreciated by those skilled in the art, in alternative preferred embodiments, other ranges of candidate scales may be applied to the coefficients at the step 412 stage. For example, in one alternative embodiment, all other possible quantization scales may be applied to the coefficients to determine which yields the best results.

As will be further appreciated by those skilled in the art, in an alternative preferred embodiment, if more than one quantization scale or level yield equally low errors as in step 415, then rather than selecting the coarsest quantization level, if one of these quantization levels is equal to that used for the previous macroblock, then it may be selected, because some bits may be saved by not having to transmit new quantization level information.

Those skilled in the art will further understand that the above-described method may be utilized on a plurality of macroblocks, rather than on a single macroblock. For example, a group of four neighboring macroblocks could be considered together to minimize error within all four macroblocks considered together. Those skilled in the art will understand how to perform this method in this fashion in view of the disclosure contained herein.

Those skilled in the art will also realize that the above-described steps apply equally to uniform quantization levels in which the same quantization factor is applied to each coefficient of a block. When a uniform quantization level is selected, the error associated with the initial quantization level is determined, as well as the error associated with quantization levels higher (i.e. coarser) than the initial level. In this manner there is formed a plurality of possible uniform quantization levels from which a uniform quantization level will be selected.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for processing signals, comprising the steps of:
   (a) determining an initial quantization level for quantizing a block of coefficient signals, wherein coefficient signals quantized with a given quantization level are associated with a quantization error;
   (b) generating at least one new quantization level in accordance with the initial quantization level;
   (c) determining the quantization error associated with the initial quantization level and the at least one new quantization level; and
   (d) selecting a quantization level from the initial quantization level and the at least one new quantization level in accordance with the determination of step (c).

2. The method of claim 1, wherein the block of coefficient signals comprises a macroblock of coefficient signals.

3. The method of claim 1, wherein the block of coefficient signals comprises a plurality of macroblocks of coefficient signals.

4. The method of claim 1, further comprising the step of:
   (e) quantizing the block of coefficient signals with the selected quantization level.

5. The method of claim 1, wherein the coefficient signals are DCT coefficient signals and the block of coefficient signals represents an image block.

6. The method of claim 1, wherein step (c) comprises the step of measuring the respective differences between coefficient signals of the block of coefficient signals and coefficient signals of a second block of coefficient signals with an L1 Norm calculation, wherein the second block of coefficient signals is reconstructed from quantized coefficient signals produced by quantizing the block of coefficient signals with a particular quantization level.

7. The method of claim 1, wherein:
   a particular quantization level corresponds to a particular quantization table formed by scaling a basic quantization table by the particular quantization level;
   the initial quantization level corresponds to an initial quantization table formed by scaling the basic quantization table by the initial quantization level;
   each new quantization level of the at least one new quantization level respectively corresponds to a new quantization table formed by scaling the basic quantization table by the new quantization level; and
   a block of coefficient signals may be quantized with a particular quantization level by applying the particular quantization table to the block of coefficient signals.

8. The method of claim 7, wherein step (b) comprises the step of generating a plurality of new quantization levels by adjusting the initial quantization level, wherein the at least one new quantization level comprises the plurality of new quantization levels.

9. The method of claim 8, wherein step (b) comprises the step of adjusting the initial quantization level to generate a plurality of new quantization levels comprising only new quantization levels coarser than the initial quantization level.

10. The method of claim 9, wherein the plurality of new quantization levels comprises every quantization level coarser than the initial quantization level.

11. The method of claim 9, wherein the plurality of new quantization levels comprises only a predetermined subset of every quantization level coarser than the initial quantization level.

12. The method of claim 9, wherein step (d) comprises the steps of:
   (1) forming a plurality of candidate quantization levels from the initial quantization level and the plurality of new quantization levels;
   (2) if one quantization level of the plurality of candidate quantization levels corresponds to a quantization error more than a predetermined threshold below the respective quantization errors of all other quantization levels of the plurality of candidate tables, then selecting the one quantization level; and
   (3) if more than one quantization level of the plurality of candidate quantization levels correspond to more than one quantization errors that are within a second predetermined threshold of each other and if each of the more than one quantization errors are below the respective quantization errors of all other quantization levels of the plurality of candidate tables, then selecting the coarsest quantization level of the more than one quantization levels.

13. The method of claim 9, wherein step (d) comprises the steps of:
   (1) forming a plurality of candidate quantization levels from the initial quantization level and the plurality of new quantization levels;
   (2) if one quantization level of the plurality of candidate quantization levels corresponds to a quantization error more than a predetermined threshold below the respective quantization errors of all other quantization levels of the plurality of candidate tables, then selecting the one quantization level; and
   (3) if more than one quantization level of the plurality of candidate quantization levels correspond to more than one quantization errors that are within a second predetermined threshold of each other and if each of the more than one quantization errors are below the respective quantization errors of all other quantization levels of the plurality of candidate tables, then selecting a quantization level of the more than one quantization levels equal to the quantization level used in quantizing an immediately previous block of coefficient signals.

14. The method of claim 1, further comprising the step of:
   (e) quantizing the block of coefficient signals with the selected quantization level;
   wherein:
   the coefficient signals are DCT coefficient signals and the block of coefficient signals represents an image block;
   a particular quantization level corresponds to a particular quantization table formed by scaling a basic quantization table by the particular quantization level;
   the initial quantization level corresponds to an initial quantization table formed by scaling the basic quantization table by the initial quantization level;
   each new quantization level of the at least one new quantization level respectively corresponds to a new quantization table formed by scaling the basic quantization table by the new quantization level;
   a block of coefficient signals may be quantized with a particular quantization level by applying the particular quantization table to the block of coefficient signals;
   step (b) comprises the step of adjusting the initial quantization level to generate a plurality of new quantization levels, wherein the at least one new quantization level comprises the plurality of new quantization levels, further wherein the plurality of new quantization levels comprises only a predetermined subset of every quantization level coarser than the initial quantization level;

step (c) comprises the step of measuring the respective differences between coefficient signals of the block of coefficient signals and coefficient signals of a second block of coefficient signals with an L1 Norm calculation, wherein the second block of coefficient signals is reconstructed from quantized coefficient signals produced by quantizing the block of coefficient signals with a particular quantization level; and step (d) comprises the steps of:
(1) forming a plurality of candidate quantization levels from the initial quantization level and the plurality of new quantization levels;
(2) if one quantization level of the plurality of candidate quantization levels corresponds to a quantization error more than a predetermined threshold below the respective quantization errors of all other quantization levels of the plurality of candidate tables, then selecting the one quantization level; and
(3) if more than one quantization level of the plurality of candidate quantization levels correspond to more than one quantization errors that are within a second predetermined threshold of each other and if each of the more than one quantization errors are below the respective quantization errors of all other quantization levels of the plurality of candidate tables, then selecting the coarsest quantization level of the more than one quantization levels.

15. An apparatus for processing signals, comprising:
(a) means for determining an initial quantization level for quantizing a block of coefficient signals, wherein coefficient signals quantized with a given quantization level are associated with a quantization error;
(b) means for generating at least one new quantization level in accordance with the initial quantization level;
(c) means for determining the quantization error associated with the initial quantization level and the at least one new quantization level; and
(d) means for selecting a quantization level from the initial quantization level and the at least one new quantization level in accordance with the determination of means (c).

16. The apparatus of claim 15, wherein the block of coefficient signals comprises a macroblock of coefficient signals.

17. The apparatus of claim 15, wherein the block of coefficient signals comprises a plurality of macroblocks of coefficient signals.

18. The apparatus of claim 15, further comprising:
(e) quantizer means for quantizing the block of coefficient signals with the selected quantization level.

19. The apparatus of claim 15, wherein the coefficient signals are DCT coefficient signals and the block of coefficient signals represents an image block.

20. The apparatus of claim 15, wherein means (c) comprises means for measuring the respective differences between coefficient signals of the block of coefficient signals and coefficient signals of a second block of coefficient signals with an L1 Norm calculation, wherein the second block of coefficient signals is reconstructed from quantized coefficient signals produced by quantizing the block of coefficient signals with a particular quantization level.

21. The apparatus of claim 15, wherein:
a particular quantization level corresponds to a particular quantization table formed by scaling a basic quantization table by the particular quantization level;
the initial quantization level corresponds to an initial quantization table formed by scaling the basic quantization table by the initial quantization level;
each new quantization level of the at least one new quantization level respectively corresponds to a new quantization table formed by scaling the basic quantization table by the new quantization level; and
a block of coefficient signals may be quantized with a particular quantization level by applying the particular quantization table to the block of coefficient signals.

22. The apparatus of claim 21, wherein means (b) comprises means for generating a plurality of new quantization levels by adjusting the initial quantization level, wherein the at least one new quantization level comprises the plurality of new quantization levels.

23. The apparatus of claim 22, wherein means (b) comprises means for adjusting the initial quantization level to generate a plurality of new quantization levels comprising only new quantization levels coarser than the initial quantization level.

24. The apparatus of claim 23, wherein the plurality of new quantization levels comprises every quantization level coarser than the initial quantization level.

25. The apparatus of claim 23, wherein the plurality of new quantization levels comprises only a predetermined subset of every quantization level coarser than the initial quantization level.

26. The apparatus of claim 23, wherein means (d) comprises:
(1) means for forming a plurality of candidate quantization levels from the initial quantization level and the plurality of new quantization levels;
(2) means for selecting one quantization level of the plurality of candidate quantization levels if the one quantization level corresponds to a quantization error more than a predetermined threshold below the respective quantization errors of all other quantization levels of the plurality of candidate tables; and
(3) means for selecting the coarsest quantization level of more than one quantization levels of the plurality of candidate quantization levels if the more than one quantization levels correspond to more than one quantization errors that are within a second predetermined threshold of each other and if each of the more than one quantization errors are below the respective quantization errors of all other quantization levels of the plurality of candidate tables.

27. The apparatus of claim 23, wherein means (d) comprises:
(1) means for forming a plurality of candidate quantization levels from the initial quantization level and the plurality of new quantization levels;
(2) means for selecting one quantization level of the plurality of candidate quantization levels if the one quantization level corresponds to a quantization error more than a predetermined threshold below the respective quantization errors of all other quantization levels of the plurality of candidate tables; and
(3) means for selecting a quantization level of more than one quantization levels of the plurality of candidate quantization levels, wherein the selected quantization level is equal to the quantization level used in quantizing an immediately previous block of coefficient signals, if the more than one quantization levels correspond to more than one quantization errors that are within a second predetermined threshold of each other and if each of the more than one quantization errors are below the respective quantization errors of all other quantization levels of the plurality of candidate tables.

28. The apparatus of claim 15, further comprising:

(e) quantizer means for quantizing the block of coefficient signals with the selected quantization level;

wherein:

the coefficient signals are DCT coefficient signals and the block of coefficient signals represents an image block;

a particular quantization level corresponds to a particular quantization table formed by scaling a basic quantization table by the particular quantization level;

the initial quantization level corresponds to an initial quantization table formed by scaling the basic quantization table by the initial quantization level;

each new quantization level of the at least one new quantization level respectively corresponds to a new quantization table formed by scaling the basic quantization table by the new quantization level;

a block of coefficient signals may be quantized with a particular quantization level by applying the particular quantization table to the block of coefficient signals;

means (b) comprises means for adjusting the initial quantization level to generate a plurality of new quantization levels, wherein the at least one new quantization level comprises the plurality of new quantization levels, further wherein the plurality of new quantization levels comprises only a predetermined subset of every quantization level coarser than the initial quantization level;

means (c) comprises means for measuring the respective differences between coefficient signals of the block of coefficient signals and coefficient signals of a second block of coefficient signals with an L1 Norm calculation, wherein the second block of coefficient signals is reconstructed from quantized coefficient signals produced by quantizing the block of coefficient signals with a particular quantization level; and means (d) comprises:

(1) means for forming a plurality of candidate quantization levels from the initial quantization level and the plurality of new quantization levels;

(2) means for selecting one quantization level of the plurality of candidate quantization levels if the one quantization level corresponds to a quantization error more than a predetermined threshold below the respective quantization errors of all other quantization levels of the plurality of candidate tables; and (3) means for selecting the coarsest quantization level of more than one quantization levels of the plurality of candidate quantization levels if the more than one quantization levels correspond to more than one quantization errors that are within a second predetermined threshold of each other and if each of the more than one quantization errors are below the respective quantization errors of all other quantization levels of the plurality of candidate tables.

29. The apparatus of claim 28, wherein the apparatus is electrically connected to a bus and the bus is electrically connected to a memory device.

30. The apparatus of claim 15, wherein the apparatus is electrically connected to a bus and the bus is electrically connected to a memory device.

* * * * *